3,145,230
VINYL AMINES FROM HALOAMIDES
Angelo John Speziale, Creve Coeur, and Robert C. Freeman, St. Louis, Mo., assignors to Monsanto Company, a corporation of Delaware
No Drawing. Filed Mar. 16, 1962, Ser. No. 180,303
10 Claims. (Cl. 260—576)

This invention relates to a novel process for the preparation of useful vinyl derivatives. More specifically the invention relates to a procedure for the preparation of vinyl amines from halogenated amides containing two organic substituents on the amide nitrogen atom. The reaction proceeds in accordance with the following equation:

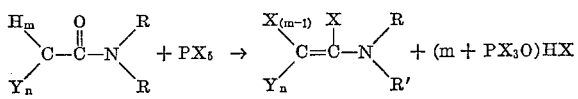

wherein X is a halogen selected from the class consisting of chlorine and bromine; wherein Y is a halogen selected from the class consisting of chlorine, bromine, and fluorine; wherein $n$ is an integer from zero (0) to two (2) and $m$ is an integer from one (1) to three (3), provided that the sum of $n$ and $m$ is two; and wherein the R and R' are radicals selected from the group consisting of the hydrocarbon radicals of the class consisting of alkyl radicals of up to 12 carbon atoms, cycloaliphatic radicals having from 5 to 7 carbon atoms, phenyl and naphthyl; and the said hydrocarbon radicals containing substituents selected from the class consisting of chloro, bromo, fluoro, nitro, cyano, ethoxy radicals having up to four carbon atoms, alkyl radicals having up to four carbon atoms, and the phenyl radical.

Useful acetamides for the practice of this invention and the preparation of N,N-diorganic substituted vinyl amides are those which have any amount of halogen substituted on the α (or 2) carbon atom.

These include:

N-cycloheptyl N-nitrobutyl 2-chloro-2-fluoroacetamide
N,N-dimethyl 2,2-dibromoacetamide
N,N-diethyl 2,2-difluoroacetamide
N,N-diethyl 2,2-dibromoacetamide
N,N-diisopropyl 2,2-dichloroacetamide
N,N-dioctyl 2,2-dichloroacetamide
N,N-dicyclohexyl 2,2-dibromoacetamide
N,N-dibenzyl 2,2-dichloroacetamide
N-methyl N-phenyl 2,2-dichloroacetamide
N-ethyl N-cyclohexyl 2,2-dichloroacetamide
N,N-di(2-methoxyethyl) 2,2-dichloroacetamide
N,N-di(4-methoxyphenyl) 2,2-dichloroacetamide
N,N-di(4-cyanophenyl) 2,2-dichloroacetamide
N,N-di(4-bromophenyl) 2,2-dichloroacetamide
N,N-di(2-nitrophenyl) 2,2-dichloroacetamide
N,N-di(2-nitropropyl) 2,2-dichloroacetamide
N-ethyl acetanilide
N-cyclohexyl p-chloroacetanilide
N-cyclohexyl N-ethyl acetamide
N,N-di(n-propyl) acetamide
N,N-diethyl acetamide
N-octyl N-benzyl acetamide
N,N-diethyl α-fluoroacetamide
N-benzyl N-ethyl α-chloroacetamide
N-dodecyl α-chloroacetanilide
N-chloroethyl N-methoxypropyl α-chloroacetamide
N-naphthyl N-methyl α-bromoacetamide
N-methyl α-chloroacetanilide
N,N-di(2-ethyl) hexyl α-bromoacetamide
N-cyclopentyl phenethyl α-fluoroacetamide
N-p-hexylphenyl N-ethyl α-bromoacetamide
N,N-methoxyphenyl α-chloroacetamide The substitution and rearrangement of the amide to the vinyl amines is effected by reaction with phosphorus pentachloride or phosphorus pentabromide. A fluid system is preferred and to attain this physical state an inert solvent may be used, for example benzene, toluene, xylene, hexane, heptane, and other hydrocarbons, chlorinated hydrocarbons, such as ethylene dichloride or ethers, such as diethyl ether. Obviously the preferred solvents are those in which the phosphorus pentahalides and the amide are soluble. The reaction will proceed at room temperatures but frequently 20 to 100° C. will provide optimum reactions with respect to velocity and yield.

By the proper selection of the amides, phosphorus pentahalide vinyl amines may be prepared with the desired substituents on the amide nitrogen and with the desired halogens on both of the carbon atoms of the vinyl group. These amides may be chosen with one or two halogens of the class consisting of chlorine, bromine, or fluorine on the α-carbon atom of the amide. The pentahalide, phosphorus pentachloride or phosphorus pentabromide is chosen so as to provide the desired halogen substituent on the carbonyl carbon atom. The halogen of the phosphorus pentahalide may also be placed on the α-carbon atom of the amide to the extent of two substitutions provided that less than two halogens were originally present in the amide.

In the conduct of this procedure amides having up to two positions on the α-carbon substituted with halogens, such as chlorine, bromine and fluorine will retain these halogen atoms in the same relative positions in the products. If less than two halogens are substituted on the α-carbon atom of the amide reactant, then at least one hydrogen atom will be present, and this will be replaced by the halogen of the phosphorus pentahalide. If the amide contains no α-halogens the phosphorus pentahalide will provide a total of two halogen substituents on the α-carbon atom. During the reaction the carbonyl oxygen is removed and an additional halogen from the phosphorus pentahalide is substituted on this site.

Further details of the novel method are set forth in the following examples.

*Example I*

To a suitable reaction vessel equipped with an agitator and condenser is mixed at room temperature 73.6 parts by weight (substantially 0.4 mole) of N,N-diethyl 2,2-dichloroacetamide and 83.3 parts by weight of phosphorus pentachloride. The mass is heated at 50–51° C. to provide a clear liquid mass. The reaction mass is then fractionally distilled and a fraction boiling at 67–75° C. at 11–14 mm. of mercury collected. This collected material is refractionated and a fraction boiling at 87–88° C. at 18 mm. of mercury collected. This collected fraction is 1,2,2-trichloro-N,N-diethylvinylamine.

*Example II*

Employing the procedure of Example I but replacing N,N-diethyl 2,2-dichloroacetamide with an equimolar amount of N,N-dimethyl 2,2-dichloroacetamide and employing a heating temperature of 75–78° C. there is obtained 1,2,2-trichloro-N,N-dimethylvinylamine, B.P. 65–66° C. at 24 mm. of mercury.

*Example III*

To a suitable reaction vessel equipped with an agitator and condenser is charged 41.6 parts by weight of phosphorus pentachloride, 56.2 parts by weight of N,N-diphenyl 2,2-dichloroacetamide and 150 parts by weight of hexane. The mass is heated with agitation for 5 hours at 60–65° C. The reaction mass is then filtered and the filtrate subjected to vacuum distillation to remove the volatiles. The residue is 1,2,2-trichloro N,N-diphenylvinylamine, which on recrystallizing from methanol gives a melting point of 49–50° C.

*Example IV*

Employing the procedure of Example III but replacing N,N-diphenyl 2,2-dichloroacetamide with an equimolar amount of N,N-di(4-chlorobenzyl) 2,2-dichloroacetamide there is obtained N,N-di(4-chlorobenzyl) 1,2,2-trichlorovinylamine.

*Example V*

A solution of N-methyl-2-chloroacetanilide (16.0 g., 0.09 mole) in benzene was stirred while phosphorus pentachloride (21.0 g., 0.1 mole) was added. The mixture was heated at 40° for 1 hour and benzene and phosphorus oxychloride were removed in vacuo. Distillation produced a small forerun and then a yellow liquid B.P. 116–129° (3–3.5 mm.). Redistillation gave N-methyl-N-phenyl-1,2,2-trichlorovinylamine, B.P. 94–98° (0.4–0.7 mm.), $n_D^{22}$ 1.5847.

It is to be understood that the foregoing examples are by way of illustration and that the process of this invention is extremely broad in its application and scope. It is to be understood that the process of this invention is of general nature and that a large variety of vinylamines may be synthesized through application of the process of the instant invention. The following vinylamines can be prepared:

1,2,2-trichloro-N-ethyl-N-phenylvinylamine
1,2,2-trichloro-N-propyl-N-hexylvinylamine
1,2,2-trichloro-N-ethyl-N-3-ethoxypropylvinylamine
1,2,2-tribromo-N-dodecyl-N-4-bromophenylvinylamine
1,2,2-trichloro-N-pentyl-N-tetradodecylvinylamine
1,2,2-trichloro-N,N-diethylvinylamine
1,2,2-trichloro-N,N-dihexylvinylamine
1,2,2-trichloro-N,N-didodecylvinylamine
1,2,2-trichloro-N,N-dipropylvinylamine
1,2,2-trichloro-N,N-diphenylvinylamine
1,2,2-trichloro-N,N-bis(2-nitrophenyl) vinylamine
1,2,2-trichloro-N,N-bis(1-chloronaphthyl) vinylamine
1,2,2-trichloro-N,N-bis(4-cyanophenyl) vinylamine
1,2,2-trichloro-N,N-dicyclohexylvinylamine
1,2,2-trichloro-N,N-bis(2-chlorocycloheptyl) vinylamine
1,2,2-trichloro-N,N-bis(2-methoxyphenyl) vinylamine
1,2,2-trichloro-N,N-bis(4-chlorophenyl) vinylamine
1,2,2-tribromo-N,N-diamylvinylamine
1,2,2-trichloro-N,N-dibutylvinylamine
1-bromo-2,2-dichloro-N,N-diethylvinylamine
1-chloro-2,2-dibromo-N,N-dimethylvinylamine
1-chloro-2,2-difluoro-N,N-diethylvinylamine
1,2,2-trichloro-N,N-bis(2-ethoxyethyl) vinylamine
1,2,2-trichloro-N,N-bis(3-bromoethoxypropyl) vinylamine
1,2,2-trichloro-N,N-bis(3-propoxypropyl) vinylamine
1,2,2-trichloro-N,N-bis(3-chlorobutyl) vinylamine
1,2,2-trichloro-N,N-bis(2,3-dichlorononyl) vinylamine
1,2,2-trichloro-N,N-bis(3-fluorophenyl) vinylamine
1,2,2-tribromo-N,N-bis(4-bromophenyl) vinylamine
1,2,2-trichloro-N,N-bis(4-biphenylyl) vinylamine This application is a continuation-in-part of application Serial No. 35,126, filed June 10, 1960, and now abandoned, both by the present applicants.

What is claimed is:

1. The method of preparing compounds of the structure

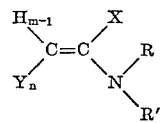

wherein $m$ is an integer from one (1) to three (3) and $n$ is an integer from zero (0) to two (2), providing that the sum of $m$ and $n$ is three (3); wherein X is halogen selected from the class consisting of chlorine, and bromine; wherein Y is a halogen selected from the class consisting of chlorine, bromine and fluorine; and wherein R and R' are organic radicals of the class consisting of hydrocarbon radicals of the group consisting of alkyl radicals from one to twelve carbon atoms, cycloalkyl radicals having 5 to 7 carbon atoms, phenyl and naphthyl radicals and the said hydrocarbon radicals having in addition substituents of the class consisting of chlorine, bromine, fluorine, alkyl radicals having up to four carbon atoms, alkoxy radicals having up to four carbon atoms, nitro, cyano, phenyl and naphthyl radicals, which comprises contacting a compound of the structure

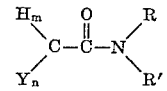

with a phosphorus pentahalide, $PX_5$.

2. The method of preparing a compound of the structure

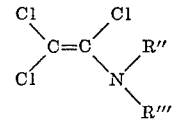

wherein R″ and R‴ are alkyl radicals of up to 12 carbon atoms which comprises heating

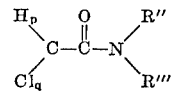

wherein $q$ is an integer from zero (0) to two (2) and $p+q$ is three (3) with phosphorus pentachloride.

3. The method of preparing a compound of the structure

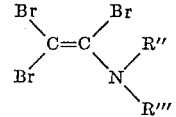

wherein R″ and R‴ are alkyl radicals of up to 12 carbon atoms which comprises heating

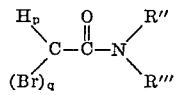

wherein $q$ is an integer from zero (0) to two (2) and $p+q$ is three (3) with phosphorus pentabromide.

4. The method of preparing a compound of the structure

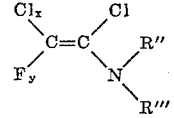

wherein $x$ is an integer from zero (0) to one (1) and $y$ is an integer from one (1) to two (2), providing $x$ plus $y$ is two (2), wherein R″ and R‴ are alkyl of up to 12 carbon atoms which comprises heating the compound

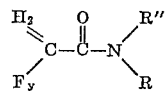

with phosphorus pentachloride.

5. The method of preparing 1,2,2-trichloro-N,N-diethylvinylamine which comprises heating N,N-diethyl-2,2-dichloroacetamide with phosphorus pentachloride.

6. The method of preparing 1,2,2-trichloro-N,N-diethylvinyl amine which comprises heating N,N-diethyl-2-chloroacetamide with phosphorus pentachloride.

7. The method of preparing 1,2,2-trichloro-N,N-diethylvinylamine which comprises heating N,N-diethylacetamide with phosphorus pentachloride.

8. The method of preparing 1,2,2-trichloro-N,N-diphenylvinylamine which comprises heating 2,2-dichloro-N,N-diphenylacetamide with phosphorus pentabromide.

9. The method of preparing 1,2,2-tribromo-N,N-diethylvinylamine which comprises heating N,N-diethylacetamide with phosphorus pentabromide.

10. The method of preparing 1,2-dichloro-2-fluoro-N,N-diethylvinylamine which comprises heating α-fluoroacetamide with phosphorus pentachloride.

No references cited.